United States Patent
Ackley

(10) Patent No.: US 10,621,470 B2
(45) Date of Patent: Apr. 14, 2020

(54) METHODS FOR OPTICAL CHARACTER RECOGNITION (OCR)

(71) Applicant: Datamax-O'Neil Corporation, Orlando, FL (US)

(72) Inventor: H. Sprague Ackley, Seattle, WA (US)

(73) Assignee: DATAMAX-O'NEIL CORPORATION, Orlando, FL (US)

( * ) Notice: Subject to any disclaimer, the term of this patent is extended or adjusted under 35 U.S.C. 154(b) by 0 days.

(21) Appl. No.: 15/720,550

(22) Filed: Sep. 29, 2017

(65) Prior Publication Data

US 2019/0102649 A1    Apr. 4, 2019

(51) Int. Cl.
*G06K 9/62* (2006.01)
*G06K 9/64* (2006.01)

(52) U.S. Cl.
CPC ......... *G06K 9/6212* (2013.01); *G06K 9/6292* (2013.01); *G06K 9/64* (2013.01); *G06K 2209/01* (2013.01)

(58) Field of Classification Search
CPC .... G06K 9/6212; G06K 9/64; G06K 2209/01; G06K 9/228; G06K 9/325; G06K 9/6292; G06K 9/2054; G06K 9/72
See application file for complete search history.

(56) References Cited

U.S. PATENT DOCUMENTS

| | | | |
|---|---|---|---|
| 6,212,401 B1 | 4/2001 | Ackley | |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,620,268 B2 | 11/2009 | Myers et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |

(Continued)

FOREIGN PATENT DOCUMENTS

WO    2013163789 A1    11/2013

*Primary Examiner* — Jianxun Yang
(74) *Attorney, Agent, or Firm* — Alston & Bird LLP

(57) ABSTRACT

A method is provided for Optical Character Recognition (OCR). A plurality of OCR decoding results each having a plurality of positions is obtained from capturing and decoding a plurality of images of the same one or more OCR characters. A recognized character in each OCR decoding result is compared with the recognized character that occupies an identical position in each of the other OCR decoding results. A number of occurrences that each particular recognized character occupies the identical position in the plurality of OCR decoding results is calculated. An individual confidence score is assigned to each particular recognized character based on the number of occurrences, with a highest individual confidence score assigned to a particular recognized character having the greatest number of occurrences. Determining which particular recognized character has been assigned the highest individual confidence score determines which particular recognized character comprises a presumptively valid character for the identical position.

19 Claims, 3 Drawing Sheets

(56) References Cited

U.S. PATENT DOCUMENTS

| | | |
|---|---|---|
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,570 B2 | 7/2014 | Wang et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |

(56) References Cited

U.S. PATENT DOCUMENTS

| | | |
|---|---|---|
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Keamey et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,350 B1 | 6/2015 | Abdulkader et al. |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,058,536 B1 * | 6/2015 | Yuan ............... G06K 9/2054 |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| D737,321 S | 8/2015 | Lee |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,304 B2 | 7/2016 | Chang et al. |
| 9,390,419 B2 | 7/2016 | Kumar et al. |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,487,113 B2 | 11/2016 | Schukalski |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |

(56) References Cited

U.S. PATENT DOCUMENTS

| | | |
|---|---|---|
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0194692 A1 | 8/2012 | Mers et al. |
| 2012/0203647 A1 | 8/2012 | Smith |
| 2012/0223141 A1 | 9/2012 | Good et al. |
| 2013/0004076 A1* | 1/2013 | Koo ................ G06K 9/228 382/176 |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0332996 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0191684 A1 | 7/2014 | Valois |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0332590 A1 | 11/2014 | Wang et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |

(56) References Cited

U.S. PATENT DOCUMENTS

| | | |
|---|---|---|
| 2015/0144698 A1 | 5/2015 | Teng et al. |
| 2015/0149946 A1 | 5/2015 | Benos et al. |
| 2015/0161429 A1 | 6/2015 | Xian |
| 2015/0178523 A1 | 6/2015 | Gelay et al. |
| 2015/0178537 A1 | 6/2015 | El et al. |
| 2015/0178685 A1 | 6/2015 | Krumel et al. |
| 2015/0181109 A1 | 6/2015 | Gillet et al. |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0212565 A1 | 7/2015 | Murawski et al. |
| 2015/0213647 A1 | 7/2015 | Laffargue et al. |
| 2015/0220753 A1 | 8/2015 | Zhu et al. |
| 2015/0220901 A1 | 8/2015 | Gomez et al. |
| 2015/0227189 A1 | 8/2015 | Davis et al. |
| 2015/0236984 A1 | 8/2015 | Sevier |
| 2015/0239348 A1 | 8/2015 | Chamberlin |
| 2015/0242658 A1 | 8/2015 | Nahill et al. |
| 2015/0248572 A1 | 9/2015 | Soule et al. |
| 2015/0254485 A1 | 9/2015 | Feng et al. |
| 2015/0261643 A1 | 9/2015 | Caballero et al. |
| 2015/0264624 A1 | 9/2015 | Wang et al. |
| 2015/0268971 A1 | 9/2015 | Barten |
| 2015/0269402 A1 | 9/2015 | Barber et al. |
| 2015/0288689 A1 | 10/2015 | Todeschini et al. |
| 2015/0288896 A1 | 10/2015 | Wang |
| 2015/0310243 A1 | 10/2015 | Ackley |
| 2015/0310244 A1 | 10/2015 | Xian et al. |
| 2015/0310389 A1 | 10/2015 | Crimm et al. |
| 2015/0312780 A1 | 10/2015 | Wang et al. |
| 2015/0327012 A1 | 11/2015 | Bian et al. |
| 2016/0014251 A1 | 1/2016 | Hejl |
| 2016/0025697 A1 | 1/2016 | Alt et al. |
| 2016/0026838 A1 | 1/2016 | Gillet et al. |
| 2016/0026839 A1 | 1/2016 | Qu et al. |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschinie et al. |
| 2017/0108895 A1 | 4/2017 | Chamberlin et al. |

(56) References Cited

U.S. PATENT DOCUMENTS

| | | |
|---|---|---|
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bemhardt |
| 2017/0193461 A1 | 7/2017 | Jonas et al. |
| 2017/0193727 A1 | 7/2017 | Van Horn et al. |
| 2017/0199266 A1 | 7/2017 | Rice et al. |
| 2017/0200108 A1 | 7/2017 | Au et al. |
| 2017/0200275 A1 | 7/2017 | McCloskey et al. |

\* cited by examiner

METHODS FOR OPTICAL CHARACTER RECOGNITION (OCR)

FIELD OF THE INVENTION

The present invention relates to reducing optical character recognition errors, and more particularly, relates to methods for optical character recognition (OCR).

BACKGROUND

Optical character recognition (referred to herein as OCR) is a useful feature that allows a computing device to recognize text (more particularly, characters thereof) in an image and convert the text of the image into machine-operable text, e.g., ASCII characters. The machine-operable text is considered an "OCR decoding result". "Machine-operable text" includes text characters that can be processed in a computer, usually as bytes. For example, users can download, photograph, or scan books, documents, product labels, etc. to obtain an image including text. The users can perform OCR on the image so as to recognize the text in the image, thereby allowing a user on his/her computer, mobile phone, tablet, etc. to select, copy, search, and edit the text.

Conventional OCR systems, however, frequently produce OCR errors (referred to as "misreads") when recognizing and decoding text. Common errors include unrecognizable or improperly converted text, e.g., an "O" (letter O) for a "0" (number zero), or an "E" for a "B". OCR errors can often render converted text unusable until a user corrects the errors. Improperly converted text can occur, for instance, when an image has a low resolution, blurred text, and/or unclear text. In another instance, conventional OCR systems may improperly convert text because the image may include uncommon characters or an underlying adjacent graphic that obscures the text. Furthermore, OCR systems can recognize illustrations in an image as text when the illustration does not actually include text. Generally speaking, Optical Character Recognition (OCR) has conventionally had an unacceptable misread rate.

In barcode scanning, a voting methodology is used to compare the decoded data string to subsequent decodes and when a sufficient number of identical scans occur, the decode is presumed to be valid and passed onto the host or application. Misreads are rare in barcode scanning and customers expect the same from OCR scanning. Unfortunately, the voting methodology does not work well in optical character recognition due to the frequency of OCR misreads—it may take a lot of scanning before a sufficient number of identical scans occur without a misread, if at all.

With an expected decoding result, a standard computer program may be conventionally used to identify a misread OCR decoding result by identifying a misread character(s) therein. For example, a plurality of OCR decoding results are depicted below, with multiple misreads detected by the standard computer program (for example, in the first line, "THEEASYDOG" should be "THELAZYDOG"):

```
OCR                    Line                    3:
P<UTOTHEEAZYDOG<<GIUICK<BROWN<FOX<
JUMPS<OVER<MISREAD
OCR                    Line                    3:
P<UTOTHELAZYDOG<<QUICK<BROWN<FOX<
JUMPS<OVER<MISREAD
OCR                    Line                    3:
P<UTOTHELAZYDOG<<QUICK<BROWN<FOX<
JUMPS<OVER<OK
OCR                    Line                    3:
P<OTOTHELAZYDOG<<QUICK<BROWN<FOX<
JUMPS<OVER<MISREAD
OCR                    Line                    3:
P<UTOTHELAZYDOG<<QUICK<BROWN<FOX<
JUMPS<OVER<MISREAD
OCR                    Line                    3:
P<UTOTHELAZYDOG<<QUICK<BROWN<FOX<
JUMPS<OVER<MISREAD
OCR                    Line                    3:
P<UTOTHBLAZYDOG<<QUICK<EROWN<FOX<
JUMPS<OVER<MISREAD
OCR                    Line                    3:
P<UTOTHELAZYDOG<<QUICK<BROWN<FOX<
JUMPS<OVER<MISREAD
OCR                    Line                    3:
P<UTOTHELAZYDOG<<QUICK<BROWN<FOX<
JUMPS<OVER<MISREAD
OCR                    Line                    3:
P<UTOTHELAZYDOG<<QUICK<BROWN<FOX<
JUMPS<OVER<$_{MISREAD}$
```

However, in the usual application in the field in which the decoding result is unknown in advance, the standard computer program is not useable for detecting a misread, and therefore for determining when a valid OCR decoding result has been obtained.

Therefore, a need exists for methods for optical character recognition (OCR). Various embodiments provide a presumptively valid OCR decoding result with a high level of confidence even if every OCR decoding result contains a misread.

SUMMARY

Accordingly, in one aspect, the present invention embraces a method for Optical Character Recognition. A plurality of OCR decoding results each having a plurality of positions is obtained from capturing and decoding a plurality of images of the same one or more OCR characters. A recognized character in each OCR decoding result is compared with the recognized character that occupies an identical position in each of the other OCR decoding results. A number of occurrences that each particular recognized character occupies the identical position in the plurality of OCR decoding results is calculated. An individual confidence score is assigned to each particular recognized character based on the number of occurrences, with a highest individual confidence score assigned to a particular recognized character having the greatest number of occurrences. Determining which particular recognized character has been assigned the highest individual confidence score determines which particular recognized character comprises a presumptively valid character for the identical position.

In another aspect, the present invention embraces a method for Optical Character Recognition (OCR). The method comprises obtaining a plurality of OCR decoding results from capturing and decoding a plurality of images of the same one or more characters. Each OCR decoding result comprises a plurality of positions. A first recognized character of each OCR decoding result of the plurality of OCR decoding results is compared with the first recognized character of each of the other OCR decoding results to determine one or more first recognized characters. Each first recognized character of the one or more first recognized characters is assigned an individual confidence score according to its respective number of occurrences as the first recognized character in the plurality of OCR decoding results. Which particular first recognized character comprises a presumptively valid first recognized character is determined by determining the particular first recognized character that has been assigned a highest individual confidence score.

In another aspect, the present invention embraces a method for Optical Character Recognition (OCR). The method comprises obtaining a plurality of OCR decoding results from capturing and decoding a plurality of images of the same one or more characters. Each OCR decoding result comprises a plurality of positions. Each recognized character of the plurality of OCR decoding results is associated with an individual confidence score. A presumptively valid OCR decoding result is identified from its total confidence score based on a combination of the individual confidence scores assigned to each of the recognized characters thereof, the presumptively valid OCR decoding result having a highest total confidence score.

The foregoing illustrative summary, as well as other exemplary objectives and/or advantages of the present invention, and the manner in which the same are accomplished, are further explained within the following detailed description and its accompanying drawings.

DETAILED DESCRIPTION

Various embodiments are directed to methods for optical character recognition (OCR). Various embodiments reduce misreads and enable misread recognition so that decoding can be aborted. Various embodiments produce dependable OCR decoding results, even if none of the OCR decoding results from capturing and scanning the same line of text and even if none of the individual OCR decoding results is a valid decoding result. Various embodiments enable or generate a presumptively valid OCR decoding result with a high level of confidence in the decoding result. The confidence level may be arbitrarily set.

As used herein, the term "presumptively valid decoding result" refers to a decoding result that may or may not be valid, but is presumed valid because each recognized character in each position of the decoding result has been assigned the highest individual confidence score or a score greater than a minimum threshold.

Various embodiments of the present invention will be described in relation to a hand-held OCR scanner. However, the present invention may be equally applicable to other types and styles of OCR-scanners (e.g., a "page scanner", such as the type used in Customs (e.g., a flat window upon which the official places a passport face down, the type where the traveler inserts the passport into a slot and the entire image is read, and the type whereby the user physically "swipes" the passport through the reader similar to the way a retailer reads a magnetic stripe)). As used herein, the term "OCR scanner" refers to a device that converts images of typed, handwritten or printed text into machine-encoded text, whether from a scanned document, a photo of a document, an image scan of a product at a point of sale (POS), a scene-photo (for example the text on signs and billboards in a landscape photo) or from subtitle text superimposed on an image (for example from a television broadcast), etc.

Figure 1:
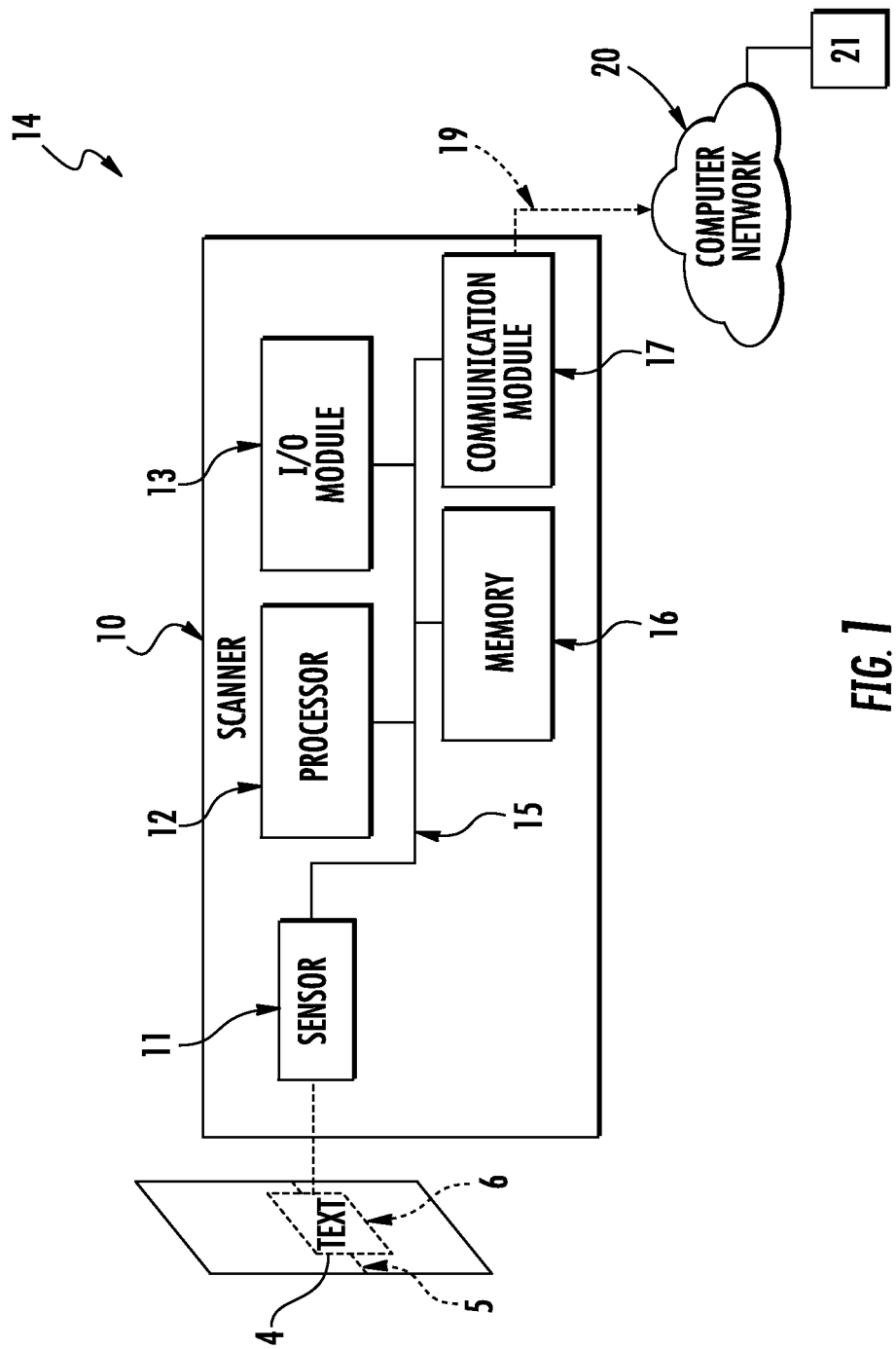
FIG. 1 is a schematic diagram of an exemplary OCR scanner useful for obtaining a plurality of OCR decoding results (such as shown, for example, in the Background and in FIG. 3 below)

Referring now to FIG. 1, an exemplary OCR scanner 10 is depicted. The OCR scanner 10 could be a single purposed device dedicated to OCR scanning, an image based bar code scanner (i.e., imager) such as an imager equipped mobile computer with OCR capability, a linear imager or CCD, or could be a general purpose mobile computing device (MCD) configured by software to scan text using an integrated camera. The exemplary OCR scanner 10 includes a sensor 11 for sensing one or more characters in a line of text 4. The sensor 11 may use a variety of techniques to sense the one or more characters. The sensor may include a laser scanner for scanning a laser across a field of view 6. A collimated beam of laser light (e.g., 630-680 nanometer wavelength) may be swept back and forth along a scan-line 5 aligned with the line of text. A light detector converts the reflected light into a scanned-OCR signal. The scanned-OCR signal may be an electronic signal with a modulated amplitude corresponding to the pattern. This modulated signal may be converted into decoded data by a processor 12 (e.g., one or more controller, digital signal processor (DSP), application specific integrated circuit (ASIC), programmable gate array (PGA), a multi-core processor, and/or programmable logic controller (PLC)) communicatively coupled to the sensor 11.

In various embodiments, the sensor 11 includes an image sensor (e.g., CCD, CMOS sensor, etc.) for capturing images of a field of view 6. To scan a line of text, the field of view 6 of the scanner is positioned to view the line of text and an image is captured with the image sensor. The processor 12 communicatively coupled to the sensor 11 converts the image of the line of text into decoded data (a decoding result).

The exemplary OCR scanner 10 also includes a memory 16 (e.g., read-only memory (ROM), flash memory, a hard-drive, etc.) that stores information. The stored information may include a processor-executable software program for decoding the line of text 4. The processor 12 may access the memory 16 to execute the steps of a decoding program for decoding the line of text.

The decoding software program configures the processor 12 to receive the information from the sensor 11 and convert the scanned-text into a decoding result. In various embodiments, the OCR scanner includes an input/output (I/O) module. The I/O module 13 (e.g., user interface) may display the decoded information (e.g., visually and/or auditory).

The subsystems in the scanner 10 are electrically connected via a coupler (e.g., wires, traces, etc.) to form an interconnection subsystem 15. The interconnection system 15 may include power buses or lines, data buses, instruction buses, address buses, etc., which allow operation of the modules/subsystems and the interaction there between.

The scanner 10 is communicatively connected to a computer network 20 via a wired or wireless data link 19 (e.g., IEEE 802.11). A host computer 21 is also communicatively coupled to the computer network 20. This data link 19 may be accessed by a communication module 17 integrated with the scanner 10. In a wireless configuration, the communication module may communicate with a host device over the network via a variety of communication protocols (e.g., WI-FI®, BLUETOOTH®, CDMA, TDMA, or GSM). In some embodiments, the scanner 10 may incorporate a cellular telephone module to communicate over a cellular network as described in U.S. Pat. No. 6,212,401, which is incorporated in its entirety herein by reference.

Figure 2:
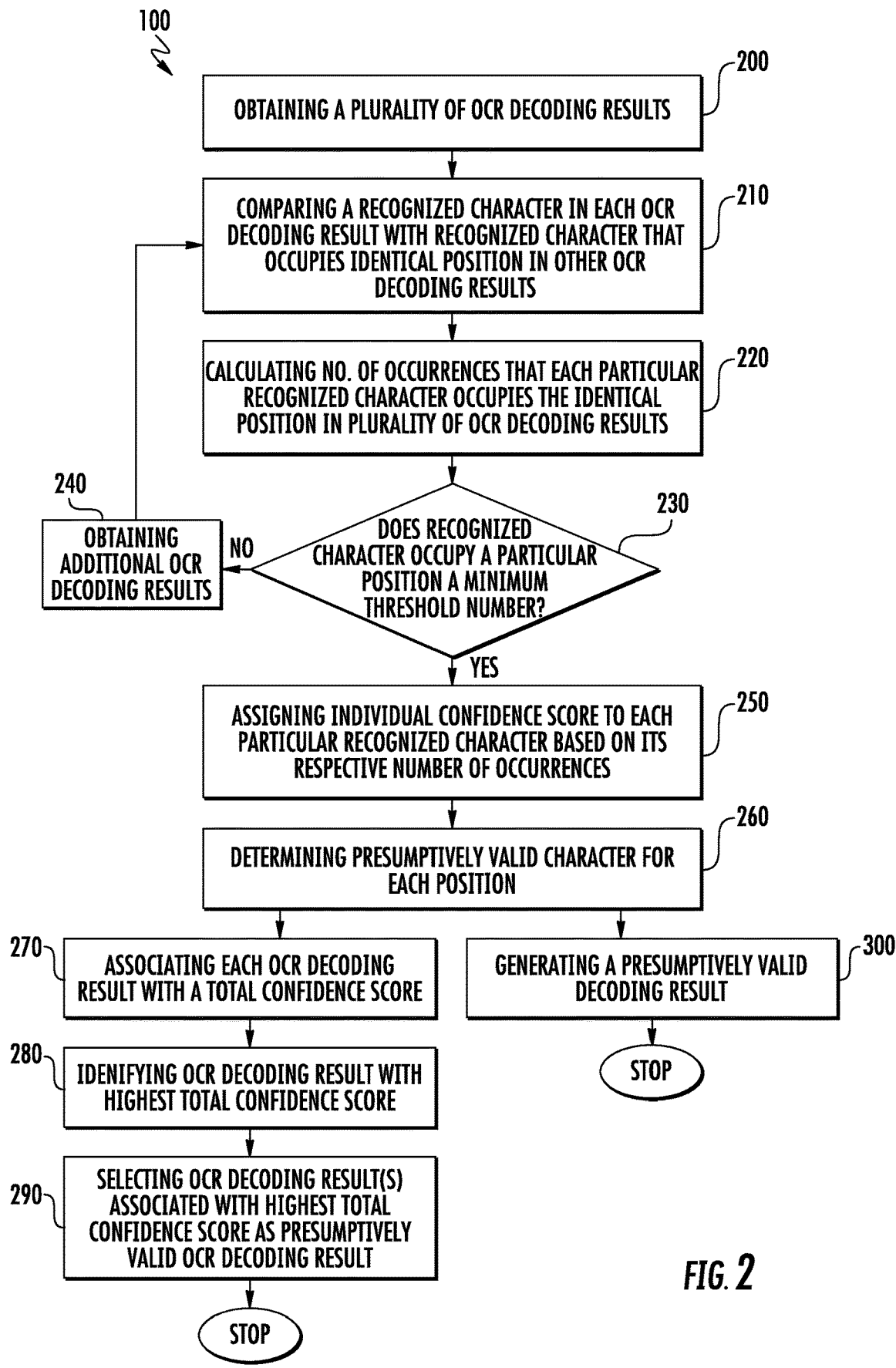
FIG. 2 is a flow diagram of a method for optical character recognition (OCR), according to various embodiments of the present invention.
Figure 3:
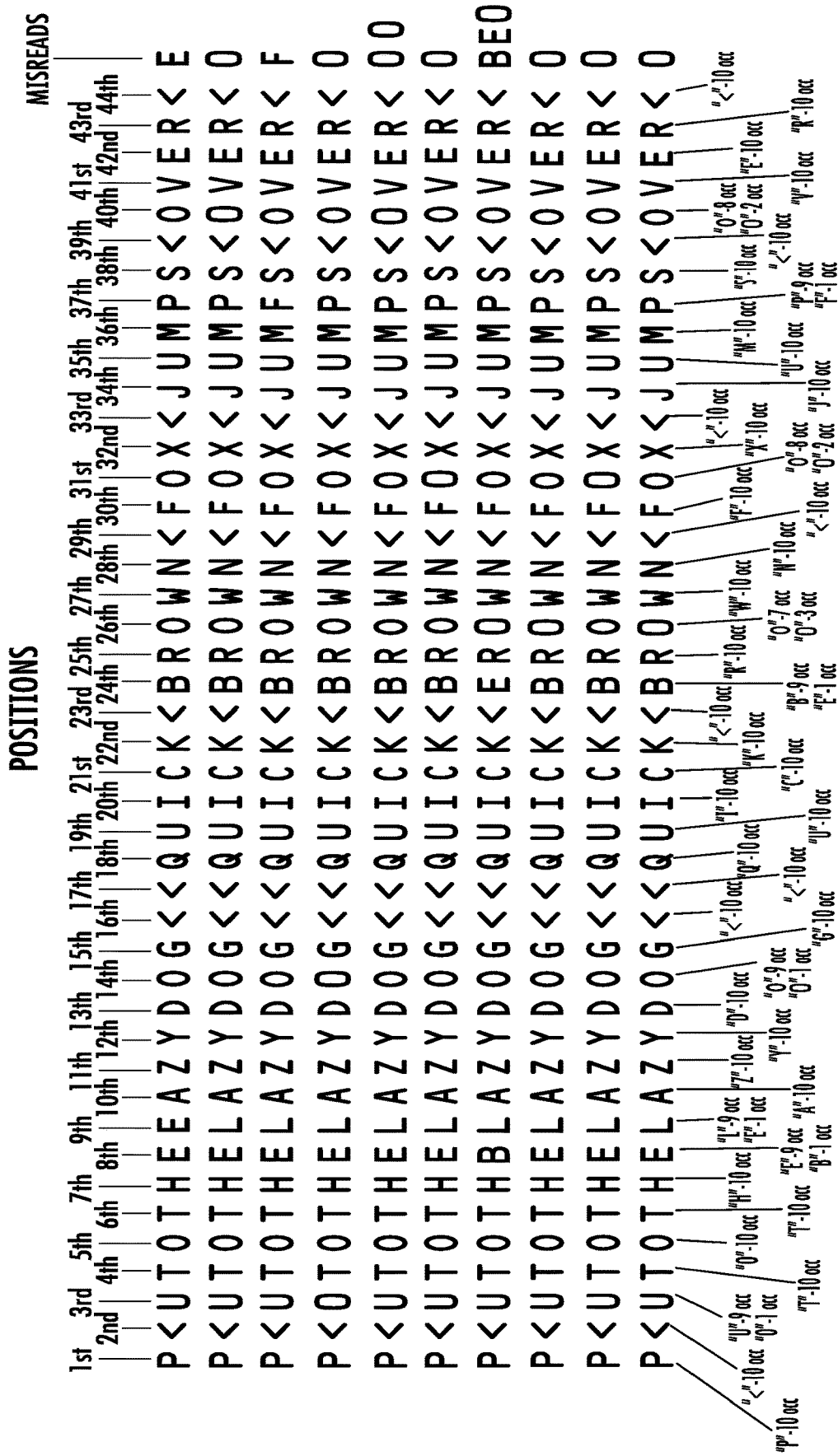
FIG. 3 graphically depicts a plurality of OCR decoding results, illustrating that methods for determining a presumptively valid OCR decoding result according to various embodiments of the present invention enable determination of a presumptively valid OCR decoding result even though every line of text (decoding result) contains a misread, according to various embodiments of the present invention.

Referring now to FIGS. 2 and 3, according to various embodiments of the present invention, a method 100 for Optical Character Recognition (OCR) is disclosed. The method 100 for Optical Character Recognition (OCR) comprises obtaining a plurality of OCR decoding results from capturing and decoding a plurality of images of the same one or more OCR characters (step 200). While the OCR decoding results of FIG. 3 use an OCR font, it is to be understood that OCR decoding results may use other than the OCR font shown, e.g., Arial, Times New Roman, Courier. Obtaining the plurality of OCR decoding results comprises capturing the plurality of images of the same one or more OCR characters and decoding each image after the plurality of images is captured or decoding after each image of the plurality of images is captured. FIG. 3 depicts ten OCR decoding results, each comprising a plurality of positions.

Still referring to FIGS. 2 and 3, according to various embodiments of the present invention, method 100 for Optical Character Recognition (OCR) comprises comparing a recognized character in each OCR decoding result of the plurality of OCR decoding results with the recognized character that occupies an identical position in each of the other OCR decoding results (step 210). For example, a first recognized character of each OCR decoding result of the plurality of OCR decoding results may be compared with the first recognized character of each of the other OCR decoding results to determine one or more first recognized characters. Each succeeding recognized character of each OCR decoding result can be compared with a recognized character occupying the identical position in each of the other OCR decoding results. In the depicted embodiment of FIG. 3 in which there are an exemplary forty-four positions, in the first decoding result, the letter "P" occupies the first position, the character "<" occupies the second position, the letter "U" occupies the third position, the letter "T" occupies the fourth position, the letter "O" occupies the fifth position, the letter "T" occupies the sixth position, the letter "H" occupies the seventh position, the letter "E" occupies the eighth position, the letter "E" (incorrectly) occupies the ninth position, and so on.

Still referring to FIG. 3, in accordance with various embodiments of the present invention, the letter "P" in the first position in the first decoding result is compared with the recognized character that occupies the identical position (the first position, in this case) in each of the other OCR decoding results. The character "<" in the second position in the first decoding result is compared with the recognized character that occupies the second position in each of the other OCR decoding results. The letter "U" in the third position in the first decoding result is compared with the recognized character that occupies the third position in each of the other OCR decoding results. The letter "T" in the fourth position in the first decoding result is compared with the recognized character that occupies the fourth position in each of the other OCR decoding results. As there are 44 exemplary positions in each of the depicted OCR decoding results of FIG. 3, the comparison step is repeated 44 times in the depicted embodiment to determine the presumptively valid character for each position as hereinafter described.

Still referring to FIGS. 2 and 3, according to various embodiments of the present invention, method 100 for Optical Character Recognition (OCR) comprises calculating a number of occurrences that each particular recognized character occupies the identical position in the plurality of OCR decoding results (step 220). For example, the letter "P" appears as the recognized character in the first position of the line of text in all ten decoding results (i.e., the letter "P" has ten occurrences (occ) and there is no other recognized character in the first position). Therefore, the letter "P" has the highest individual confidence score for the first position and is therefore the presumptively valid character for the first position. The character "<" appears as the recognized character in the second position of the line of text in all ten decoding results (i.e., the character "<" has ten occurrences and there is no other recognized character in the second position). Therefore, the character "<" has the highest individual confidence score for the second position and is therefore the presumptively valid character for the second position. Looking now at the third position in each decoding result of the ten exemplary decoding results, there are nine occurrences of the letter "U" and one occurrence of the letter "O". The letter "U" in the third position, and not the letter "O", is the presumptively valid character with more occurrences thereof in the third position relative to the number of occurrences of the letter "O". There are ten occurrences of the letter "T" in the fourth position, ten occurrences of the letter "O" in the fifth position, ten occurrences of the letter "T" in the sixth position, and ten occurrences of the letter "H" in the seventh position. These recognized characters are therefore presumptively valid characters for each of their respective positions. However, in the eighth position, the letter "E" was misread as "B" in the seventh decoding result and in the ninth position, the letter "L" was misread as the letter "E" in the first OCR decoding result. For the eighth position, the letter "E" is the presumptively valid character with nine occurrences versus one occurrence for the letter "B". For the ninth position, the letter "L" is the presumptively valid character with nine occurrences, whereas the letter "E" only has one occurrence. As noted previously, each succeeding recognized character of each OCR decoding result can be compared with a recognized character occupying the identical position in each of the other OCR decoding results. The next discrepancy between recognized characters in a respective position is in the letter "O" in DOG (i.e., the $14^{th}$ position), with the fourth decoding result from the top misreading the number "0" instead of the letter "O". As the letter "O" occupying the $14^{th}$ position in nine out of ten decoding results (nine occurrences) versus the number "0" with one occurrence, the letter "O" is the presumptively valid character for the $14^{th}$ position. In the word "BROWN", the letter "B" occupies the $24^{th}$ position in nine decoding results with the letter "E" occupying the $24^{th}$ position for one occurrence. Therefore, for the $24^{th}$ position, B is the presumptively valid character. The letter "O" in the word "BROWN" occupies the $26^{th}$ position in each decoding result seven times out of ten decoding results and the number "0" has only three occurrences in the $27^{th}$ position. Therefore, the letter "O" is the presumptively valid character for the $27^{th}$ position. In the word "FOX", the letter "O" has eight occurrences whereas the number "0" has two occurrences in the $31^{st}$ position. Therefore, for the $31^{st}$ position, the letter "O" is the presumptively valid character. In the word "JUMPS", the letter "P" has nine occurrences whereas the letter "F" (third OCR decoding result of FIG. 3) has only one occurrence. Therefore, the letter "P" is the presumptively valid character for the 37th position as it has more occurrences than the letter "F" for that position. In the word "OVER", the letter "O" in the $40^{nd}$ position has eight occurrences whereas the number "0" has only two occurrences, making the letter "O" the presumptively valid character for that position. The number of occurrences that a recognized character occupies a particular position in the plurality of OCR decoding results is calculated.

Stated simply, if the same recognized character occupies the same position in all decoding results, the recognized character is the presumptively valid character for that position (e.g., if the letter "A" occupies the same position in all decoding results, the letter "A" is the presumptively valid character for that position). On the other hand, if there is more than one recognized character occupying the same position in the plurality of decoding results, the presumptively valid character is the recognized character that occupies the same position in a greater number of decoding results (the recognized character with the greater number of occurrences) as hereinafter described.

The recognized character from capturing and decoding each image of the plurality of images may be transmitted to a memory space and each occurrence of the recognized character aggregated in the memory space for calculating the number of occurrences as previously described.

A lexicon for the plurality of OCR decoding results may be predetermined. If the recognized character is not included in the predetermined lexicon, it can be determined whether to include or exclude the recognized character in the calculation of the number of occurrences. For example, the number "0" is often misread as the letter "O", and vice versa. By including the number "0" in the predetermined lexicon, i.e., it occurs in a numeric-only field such as a passport number, it may be included in the number of occurrences for the letter "O" so as to not over exclude. By excluding the number "0" in the predetermined lexicon, the number "0" could not be a presumptively valid character. Relatedly, different characters can have different levels of confidence depending on their propensity for misreading. Sometimes there are known attributes in a given field that can be applied. For example, for the decoding result "BROWN", it is known that it is a non-numeric field so that misreads into a digit are not counted.

In various embodiments of the present invention, the method 100 for Optical Character Recognition (OCR) may further comprise verifying that the number of OCR decoding results in which the recognized character occupies the particular position comprises a minimum threshold number of OCR decoding results (step 230). If the calculated number of OCR decoding results in which the recognized character occupies the particular position does not comprise the minimum threshold number of OCR decoding results, additional OCR decoding results may be obtained by capturing and decoding additional images of the same one or more characters (step 240). The comparing, calculating, and assigning steps may then be repeated with the original OCR decoding results and the additional OCR decoding results until the calculated number of OCR decoding results in which the recognized character occupies the particular position comprises the minimum threshold number of OCR decoding result out of the total number of OCR decoding results (a minimum threshold percentage). For example, if a particular recognized character occupies a particular position in only half the decoding results, there may not be confidence that the particular recognized character is the presumptively valid character for that position. The minimum threshold number or percentage can be set to any threshold desired, for example, 7 in 10 or better.

If there is significant background noise or an out of focus situation, it may be possible that no one recognized character emerges as the recognized character with the highest number of occurrences and therefore no one recognized character can be assigned the highest individual confidence score. It may be necessary to obtain additional OCR decoding results (hopefully after eliminating at least some of the background noise or improving the focus). In this situation, the imager can be configured to capture and buffer images continually or the scanner can offer auditory or visual cues to the user to continue scanning.

Still referring to FIGS. 2 and 3, according to various embodiments of the present invention, the method 100 for Optical Character Recognition (OCR) comprises assigning an individual confidence score to each particular recognized character based on its respective number of occurrences, with a highest individual confidence score assigned to a particular recognized character having the greatest number of occurrences for that position (step 250) (i.e., the highest individual confidence score is assigned to a particular recognized character that occupies a particular position within the greatest number of OCR decoding results) (whether that includes original OCR decoding results, or original and additional OCR decoding results). The comparison, calculation, and assignment steps are completed over all recognized characters included in each position of each OCR decoding result of the plurality of OCR decoding results so that each particular recognized character has an individual confidence score.

Still referring to FIGS. 2 and 3, according to various embodiments of the present invention, the method 100 for Optical Character Recognition (OCR) comprises determining which particular recognized character comprises a presumptively valid character for each position by determining which particular recognized character for that position has been assigned the highest individual confidence score (step 260). As noted previously, if only one recognized character occupies the same position in each decoding result, that one particular recognized character has a 100% confidence score that it is the presumptively valid character for that particular position. While only two alternative recognized characters for some of the positions of FIG. 3 are described, it is to be understood that there may be multiple recognized characters in each position, with each occupying the position for a number of occurrences. For example, the $8^{th}$ position could have had 7 E's, 2 B's, and an F. The recognized character occupying the same position the greatest number of occurrences is the presumptively valid character for that position. If there is a tie in the number of occurrences, it may be necessary to obtain additional decoding results until a particular recognized character leads by a selected margin as the recognized character in that particular position with the highest confidence score.

The method 100 for Optical Character Recognition (OCR) comprises repeating the comparing, calculating, assigning, and determining steps for each position in the decoding result to determine the presumptively valid character for each position. In various embodiments of the present invention, the comparing, calculating, assigning, and determining steps may be completed for each position prior to moving onto the next position where comparison, calculation, assignment, and determination steps are repeated for determining the presumptively valid character for the next position, and so on for each position. However, it is not necessary that all steps be completed in sequence prior to moving onto a next position. It may be possible to return to a position for determining the presumptively valid decoding result.

Still referring to FIGS. 2 and 3, according to various embodiments of the present invention, the method 100 for Optical Character Recognition (OCR) further comprises associating each OCR decoding result with a total confidence score based on a combination of the individual confidence scores assigned to each particular recognized character therein (step 270), identifying the OCR decoding result(s) that is/are associated with the highest total confidence score (step 280), and selecting the OCR decoding result(s) that is/are associated with the highest total confidence score as the presumptively valid OCR decoding result (step 290). There may be more than one presumptively valid OCR decoding result in the plurality of OCR decoding results obtained in step 200, as long as the presumptively valid OCR decoding results are identical.

The OCR decoding result may be selected as the presumptively valid decoding result even when the selected OCR decoding result does not match another OCR decoding result of the plurality of OCR decoding results or when none of the plurality of decoding results is correctly decoded in its entirety because the presumptively valid decoding result is the decoding result with the highest total confidence score.

In various embodiments of the present invention, it is to be understood that the presumptively valid decoding result may alternatively be generated from an ordered combination of the presumptively valid characters (the characters with the highest individual confidence scores), in which case the presumptively valid decoding result may be absent from the plurality of decoding results obtained in step 200 (step 300).

FIG. 3 demonstrates the improvement over the voting methodology used in barcode scanning. As noted previously, voting compares the data string to subsequent decodes and when a sufficient number of identical scans occur, the decode is passed. In accordance with various embodiments of the present invention, every recognized character in the decoding results is analyzed statistically and the decoding result may be a presumptively valid decoding result even if none of the scans matches a subsequent scan.

From the foregoing, it is to be understood that various embodiments determine a presumptively valid optical character recognition (OCR) decoding result. Various embodiments reduce misreads and enable misread recognition so that decoding can be aborted. Various embodiments help determine presumptively valid OCR decoding results, even if none of the individual OCR decoding results obtained is a valid decoding result. Various embodiments enable or generate a presumptively valid OCR decoding result with a high level of confidence in the decoding result.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. 8,740,082;
U.S. Pat. No. 8,740,085; U.S. Pat. No. 8,746,563;
U.S. Pat. No. 8,750,445; U.S. Pat. No. 8,752,766;
U.S. Pat. No. 8,756,059; U.S. Pat. No. 8,757,495;
U.S. Pat. No. 8,760,563; U.S. Pat. No. 8,763,909;
U.S. Pat. No. 8,777,108; U.S. Pat. No. 8,777,109;
U.S. Pat. No. 8,779,898; U.S. Pat. No. 8,781,520;
U.S. Pat. No. 8,783,573; U.S. Pat. No. 8,789,757;
U.S. Pat. No. 8,789,758; U.S. Pat. No. 8,789,759;
U.S. Pat. No. 8,794,520; U.S. Pat. No. 8,794,522;
U.S. Pat. No. 8,794,525; U.S. Pat. No. 8,794,526;
U.S. Pat. No. 8,798,367; U.S. Pat. No. 8,807,431;
U.S. Pat. No. 8,807,432; U.S. Pat. No. 8,820,630;
U.S. Pat. No. 8,822,848; U.S. Pat. No. 8,824,692;
U.S. Pat. No. 8,824,696; U.S. Pat. No. 8,842,849;
U.S. Pat. No. 8,844,822; U.S. Pat. No. 8,844,823;
U.S. Pat. No. 8,849,019; U.S. Pat. No. 8,851,383;
U.S. Pat. No. 8,854,633; U.S. Pat. No. 8,866,963;
U.S. Pat. No. 8,868,421; U.S. Pat. No. 8,868,519;
U.S. Pat. No. 8,868,802; U.S. Pat. No. 8,868,803;
U.S. Pat. No. 8,870,074; U.S. Pat. No. 8,879,639;
U.S. Pat. No. 8,880,426; U.S. Pat. No. 8,881,983;
U.S. Pat. No. 8,881,987; U.S. Pat. No. 8,903,172;
U.S. Pat. No. 8,908,995; U.S. Pat. No. 8,910,870;
U.S. Pat. No. 8,910,875; U.S. Pat. No. 8,914,290;
U.S. Pat. No. 8,914,788; U.S. Pat. No. 8,915,439;
U.S. Pat. No. 8,915,444; U.S. Pat. No. 8,916,789;
U.S. Pat. No. 8,918,250; U.S. Pat. No. 8,918,564;
U.S. Pat. No. 8,925,818; U.S. Pat. No. 8,939,374;
U.S. Pat. No. 8,942,480; U.S. Pat. No. 8,944,313;
U.S. Pat. No. 8,944,327; U.S. Pat. No. 8,944,332;

U.S. Pat. No. 8,950,678; U.S. Pat. No. 8,967,468;
U.S. Pat. No. 8,971,346; U.S. Pat. No. 8,976,030;
U.S. Pat. No. 8,976,368; U.S. Pat. No. 8,978,981;
U.S. Pat. No. 8,978,983; U.S. Pat. No. 8,978,984;
U.S. Pat. No. 8,985,456; U.S. Pat. No. 8,985,457;
U.S. Pat. No. 8,985,459; U.S. Pat. No. 8,985,461;
U.S. Pat. No. 8,988,578; U.S. Pat. No. 8,988,590;
U.S. Pat. No. 8,991,704; U.S. Pat. No. 8,996,194;
U.S. Pat. No. 8,996,384; U.S. Pat. No. 9,002,641;
U.S. Pat. No. 9,007,368; U.S. Pat. No. 9,010,641;
U.S. Pat. No. 9,015,513; U.S. Pat. No. 9,016,576;
U.S. Pat. No. 9,022,288; U.S. Pat. No. 9,030,964;
U.S. Pat. No. 9,033,240; U.S. Pat. No. 9,033,242;
U.S. Pat. No. 9,036,054; U.S. Pat. No. 9,037,344;
U.S. Pat. No. 9,038,911; U.S. Pat. No. 9,038,915;
U.S. Pat. No. 9,047,098; U.S. Pat. No. 9,047,359;
U.S. Pat. No. 9,047,420; U.S. Pat. No. 9,047,525;
U.S. Pat. No. 9,047,531; U.S. Pat. No. 9,053,055;
U.S. Pat. No. 9,053,378; U.S. Pat. No. 9,053,380;
U.S. Pat. No. 9,058,526; U.S. Pat. No. 9,064,165;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Pat. No. 9,076,459; U.S. Pat. No. 9,079,423;
U.S. Pat. No. 9,080,856; U.S. Pat. No. 9,082,023;
U.S. Pat. No. 9,082,031; U.S. Pat. No. 9,084,032;
U.S. Pat. No. 9,087,250; U.S. Pat. No. 9,092,681;
U.S. Pat. No. 9,092,682; U.S. Pat. No. 9,092,683;
U.S. Pat. No. 9,093,141; U.S. Pat. No. 9,098,763;
U.S. Pat. No. 9,104,929; U.S. Pat. No. 9,104,934;
U.S. Pat. No. 9,107,484; U.S. Pat. No. 9,111,159;
U.S. Pat. No. 9,111,166; U.S. Pat. No. 9,135,483;
U.S. Pat. No. 9,137,009; U.S. Pat. No. 9,141,839;
U.S. Pat. No. 9,147,096; U.S. Pat. No. 9,148,474;
U.S. Pat. No. 9,158,000; U.S. Pat. No. 9,158,340;
U.S. Pat. No. 9,158,953; U.S. Pat. No. 9,159,059;
U.S. Pat. No. 9,165,174; U.S. Pat. No. 9,171,543;
U.S. Pat. No. 9,183,425; U.S. Pat. No. 9,189,669;
U.S. Pat. No. 9,195,844; U.S. Pat. No. 9,202,458;
U.S. Pat. No. 9,208,366; U.S. Pat. No. 9,208,367;
U.S. Pat. No. 9,219,836; U.S. Pat. No. 9,224,024;
U.S. Pat. No. 9,224,027; U.S. Pat. No. 9,230,140;
U.S. Pat. No. 9,235,553; U.S. Pat. No. 9,239,950;
U.S. Pat. No. 9,245,492; U.S. Pat. No. 9,248,640;
U.S. Pat. No. 9,250,652; U.S. Pat. No. 9,250,712;
U.S. Pat. No. 9,251,411; U.S. Pat. No. 9,258,033;
U.S. Pat. No. 9,262,633; U.S. Pat. No. 9,262,660;
U.S. Pat. No. 9,262,662; U.S. Pat. No. 9,269,036;
U.S. Pat. No. 9,270,782; U.S. Pat. No. 9,274,812;
U.S. Pat. No. 9,275,388; U.S. Pat. No. 9,277,668;
U.S. Pat. No. 9,280,693; U.S. Pat. No. 9,286,496;
U.S. Pat. No. 9,298,964; U.S. Pat. No. 9,301,427;
U.S. Pat. No. 9,313,377; U.S. Pat. No. 9,317,037;
U.S. Pat. No. 9,319,548; U.S. Pat. No. 9,342,723;
U.S. Pat. No. 9,361,882; U.S. Pat. No. 9,365,381;
U.S. Pat. No. 9,373,018; U.S. Pat. No. 9,375,945;
U.S. Pat. No. 9,378,403; U.S. Pat. No. 9,383,848;
U.S. Pat. No. 9,384,374; U.S. Pat. No. 9,390,304;
U.S. Pat. No. 9,390,596; U.S. Pat. No. 9,411,386;
U.S. Pat. No. 9,412,242; U.S. Pat. No. 9,418,269;
U.S. Pat. No. 9,418,270; U.S. Pat. No. 9,465,967;
U.S. Pat. No. 9,423,318; U.S. Pat. No. 9,424,454;
U.S. Pat. No. 9,436,860; U.S. Pat. No. 9,443,123;
U.S. Pat. No. 9,443,222; U.S. Pat. No. 9,454,689;
U.S. Pat. No. 9,464,885; U.S. Pat. No. 9,465,967;
U.S. Pat. No. 9,478,983; U.S. Pat. No. 9,481,186;
U.S. Pat. No. 9,487,113; U.S. Pat. No. 9,488,986;
U.S. Pat. No. 9,489,782; U.S. Pat. No. 9,490,540;
U.S. Pat. No. 9,491,729; U.S. Pat. No. 9,497,092;
U.S. Pat. No. 9,507,974; U.S. Pat. No. 9,519,814;
U.S. Pat. No. 9,521,331; U.S. Pat. No. 9,530,038;
U.S. Pat. No. 9,572,901; U.S. Pat. No. 9,558,386;
U.S. Pat. No. 9,606,581; U.S. Pat. No. 9,646,189;
U.S. Pat. No. 9,646,191; U.S. Pat. No. 9,652,648;
U.S. Pat. No. 9,652,653; U.S. Pat. No. 9,656,487;
U.S. Pat. No. 9,659,198; U.S. Pat. No. 9,680,282;
U.S. Pat. No. 9,697,401; U.S. Pat. No. 9,701,140;
U.S. Design Pat. No. D702,237;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D734,339;
U.S. Design Pat. No. D737,321;
U.S. Design Pat. No. D754,205;
U.S. Design Pat. No. D754,206;
U.S. Design Pat. No. D757,009;
U.S. Design Pat. No. D760,719;
U.S. Design Pat. No. D762,604;
U.S. Design Pat. No. D766,244;
U.S. Design Pat. No. D777,166;
U.S. Design Pat. No. D771,631;
U.S. Design Pat. No. D783,601;
U.S. Design Pat. No. D785,617;
U.S. Design Pat. No. D785,636;
U.S. Design Pat. No. D790,505;
U.S. Design Patent No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;

U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;

U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;
U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;
U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, typical embodiments of the present invention have been disclosed. The present

The invention claimed is:

1. A method for Optical Character Recognition (OCR), the method comprising:
comparing a first recognized character at a first position in a first OCR decoding result with the first recognized character in a second position in a second OCR decoding result that corresponds to the first position in the first OCR decoding result;
identifying a predefined lexicon for the first OCR decoding result and the second OCR decoding result;
calculating a number of occurrences of recognized characters occupying identical positions in the first OCR decoding result and the second OCR decoding result;
in response to determining that the first recognized character is not in the predefined lexicon, excluding the first recognized character from the number of occurrences of recognized characters;
assigning an individual confidence score to each recognized character of the recognized characters based on the number of occurrences, wherein a highest individual confidence score is assigned to a particular recognized character having a highest number of occurrences;
determining the particular recognized character having the highest individual score as a valid character for the position.

2. The method according to claim 1, further comprising determining a valid character for each position of the first and second OCR decoding results.

3. The method according to claim 2, further comprising:
associating each of the first and second OCR decoding results with a total confidence score based on a combination of the individual confidence scores assigned to each recognized character therein;
identifying an OCR decoding result from amongst the first and second OCR decoding results that is associated with a highest total confidence score; and
selecting the OCR decoding result that is associated with the highest total confidence score as a valid OCR decoding result.

4. The method according to claim 3, wherein selecting the OCR decoding result comprises selecting the OCR decoding result as the valid decoding result even when the selected OCR decoding result does not match another OCR decoding result of the first and second OCR decoding results.

5. The method according to claim 3, wherein selecting the OCR decoding result comprises selecting the OCR decoding result as the valid decoding result even when none of the first and second decoding results is correctly decoded in its entirety.

6. The method according to claim 2, further comprising generating a valid decoding result from an ordered combination of valid characters, the valid decoding result being absent from the first and second OCR decoding results.

7. The method according to claim 1, further comprising obtaining a plurality of OCR decoding results, comprising the first and second OCR decoding results, wherein the obtaining comprises:
capturing a plurality of images of one or more OCR characters; and
decoding each image after the plurality of images is captured or after each image of the plurality of images is captured.

8. The method according to claim 7, wherein the one or more OCR characters in each image of the plurality of images comprise greater than one OCR characters and a line of text.

9. The method according to claim 1, further comprising, prior to the calculating step, transmitting the first recognized character to a memory space and aggregating each occurrence of the first recognized character in the memory space for calculating the number of occurrences.

10. A method for Optical Character Recognition (OCR), the method comprising:
comparing a first recognized character of a first OCR decoding result with a first recognized character of a second OCR decoding result to determine one or more first recognized characters;
identifying a predefined lexicon for the first and second OCR decoding results;
calculating a number of occurrences of recognized characters occupying identical positions in the first and second OCR decoding results;
in response to determining that a particular first recognized character of the one or more first recognized characters is not in the predefined lexicon, excluding the particular first recognized character from the number of occurrences of recognized characters;
assigning each first recognized character of the one or more first recognized characters an individual confidence score according to its respective on the number of recognized characters; and
determining a first recognized character having assigned the highest individual confidence score as a valid first recognized character.

11. The method according to claim 10, further comprising:
comparing each succeeding recognized character of the first OCR decoding result with a recognized character occupying an identical position in the second OCR decoding result and assigning each succeeding recognized character an individual confidence score according to its respective number of occurrences, until comparison and assignment are completed over all recognized characters for each position of the first and second OCR decoding results; and
determining, for each position, a particular recognized character having assigned the highest individual confidence score as valid character for that position.

12. The method according to claim 11, further comprising:
associating each of the first and second OCR decoding results with a total confidence score based on a combination of the individual confidence scores assigned to respective recognized characters in each of the first and second OCR decoding results;
identifying an OCR decoding result, from amongst the first and second OCR decoding results, that is associated with a highest total confidence score; and
selecting the OCR decoding result that is associated with the highest total confidence score as valid OCR decoding result.

13. The method according to claim 12, wherein selecting the OCR decoding result comprises selecting the OCR decoding result as the valid decoding result even when the selected OCR decoding result does not match another OCR decoding result of the first and second OCR decoding results.

14. The method according to claim 12, wherein selecting the OCR decoding result comprises selecting the OCR decoding result as the valid decoding result even when none of the first and second OCR decoding results is correctly decoded in its entirety.

15. The method according to claim 11, further comprising generating the valid decoding result from an ordered combination of the valid characters for each position, the valid decoding result being absent from the first and second OCR decoding results.

16. A method for Optical Character Recognition (OCR) the method comprising:
   comparing a first character a first OCR decoding result with the first character of a second OCR decoding result;
   identifying a predefined lexicon for the first and second OCR decoding results;
   calculating a number of occurrences of recognized characters occupying identical positions in the first OCR decoding result and the second OCR decoding result;
   in response to determining that the first character is not in the predefined lexicon, excluding the first character from the number of occurrences of recognized characters;
   associating each recognized character of the recognized characters with an individual confidence score; and
   identifying a valid OCR decoding result from amongst the first and second OCR decoding results, based on a total confidence score, wherein the total confidence score is computed based on a combination of the individual confidence scores assigned to each of the recognized characters thereof, and wherein the valid OCR decoding has a highest total confidence score.

17. The method according to claim 16, further comprising:
   obtaining a plurality of OCR decoding results, comprising the first and second OCR decoding results, wherein associating each recognized character comprises:
   assigning the individual confidence score to a recognized character in a particular position based on a number of the plurality of OCR decoding results in which the recognized character occupies the particular position.

18. The method according to claim 17, wherein associating each recognized character with the individual confidence score comprises assigning a highest individual confidence score to a particular recognized character that occupies a particular position within a highest number of the plurality of OCR decoding results.

19. The method according to claim 17, further comprising:
   verifying that the number of the plurality of OCR decoding results in which the recognized character occupies the particular position comprises a minimum threshold;
   obtaining additional OCR decoding results by capturing and decoding additional images of the one or more characters, if the number of OCR decoding results in which the recognized character occupies the particular position is less than or equal to the minimum threshold;
   comparing, for the plurality of OCR decoding results and the additional OCR decoding results, each recognized character present in each of the plurality of OCR decoding results and the additional OCR decoding results with other recognized characters occupying identical positions;
   calculating a number of occurrences of each recognized character occupying the identical position in the plurality of OCR decoding results including the additional OCR decoding results; and
   assigning the individual confidence score to the recognized character in the particular position based on the number of the plurality of OCR decoding results, including the additional OCR decoding results, in which the recognized character occupies the particular position.

* * * * *